(12) United States Patent
Groddeck et al.

(10) Patent No.: US 7,410,444 B2
(45) Date of Patent: Aug. 12, 2008

(54) DRIVE UNIT FOR A HYBRID MOTOR VEHICLE

(75) Inventors: Michael Groddeck, Meckenbeuren (DE); Joachim Huster, Friedrichshafen (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 323 days.

(21) Appl. No.: 11/362,580

(22) Filed: Feb. 24, 2006

(65) Prior Publication Data

US 2006/0196750 A1  Sep. 7, 2006

(30) Foreign Application Priority Data

Mar. 2, 2005  (DE) .................. 10 2005 009 446

(51) Int. Cl.
*B60K 6/20* (2007.10)
*B60K 6/387* (2007.10)

(52) U.S. Cl. .................. 477/5; 192/83; 192/84.31; 192/84.8; 192/105 BA

(58) Field of Classification Search .............. 192/84.31; 290/27
See application file for complete search history.

(56) References Cited

U.S. PATENT DOCUMENTS 2,597,854 A * 5/1952 Cross et al. ........... 192/105 BA
2,825,437 A * 3/1958 Reykjalin ............. 192/105 BA
6,176,785 B1 * 1/2001 Geislinger ................. 464/100
6,422,366 B1 * 7/2002 Uehara ................. 192/105 BA
6,846,258 B2 * 1/2005 Aoki ......................... 192/207

FOREIGN PATENT DOCUMENTS

DE          43 23 601         1/1995
WO    WO 2004/054836 A1 *   7/2004

* cited by examiner

*Primary Examiner*—Rodney H Bonck
(74) *Attorney, Agent, or Firm*—Klaus J. Bach

(57) ABSTRACT

In a drive unit for a hybrid motor vehicle including an internal combustion engine and a dynamoelectric machine to be connected to a transmission of the motor vehicle, wherein the drive unit comprises an input shaft connected to the internal combustion engine, an output shaft connected to the dynamoelectric machine for rotation therewith and a clutch for connecting the input shaft to the output shaft, the clutch includes centrifugal actuators for causing engagement of the clutch upon rotation at a speed in excess of a threshold value, springs counteracting the centrifugal actuators for causing the release of the clutch at a speed below the threshold value, and an electromagnetic actuators for causing engagement of the clutch at a speed below the threshold value to permit startup operation of the internal combustion engine by the dynamoelectric machine.

9 Claims, 2 Drawing Sheets

DRIVE UNIT FOR A HYBRID MOTOR VEHICLE

BACKGROUND OF THE INVENTION

The invention relates to a drive unit for a hybrid motor vehicle for coupling an internal combustion engine and/or an electro-dynamic machine to a transmission.

DE 43 23 601 A1 discloses a drive unit for a hybrid motor vehicle which includes an input shaft, a single disc dry clutch, an output shaft and an electric motor-generator. The input shaft is driven by the internal combustion engine. Within the drive unit, the input shaft is connected to the primary side of the clutch. The output shaft extends to the transmission and is connected within the drive unit to the secondary side of the clutch and the motor-generator. When the clutch is closed, a power path is established from the internal combustion engine via the input shaft and the clutch to the output shaft. The state of the clutch is determined by a throw-out plunger, a throw-out bearing and a closing spring effective in axial direction. During operation by the electric motor, the clutch must be de-activated in order to uncouple the internal combustion engine from the motor-generator. To this end, the closing spring must be held in the non-closing position, that is, a corresponding high holding force must be applied via the throw-out plunger and the throw-out bearing. Critical also is the use of single disc and two-disc dry clutches for hybrid vehicles with high-torque internal combustion engines, of for example, more than 1000 Nm. A single disc dry clutch for the transmission of such high torques requires a relatively large space which increases the weight correspondingly.

It is therefore the object of the present invention to provide a drive unit capable of transmitting a high torque while having only moderately large space requirements.

SUMMARY OF THE INVENTION

In a drive unit for a hybrid motor vehicle including an internal combustion engine and a dynamoelectric machine to be connected to a transmission of the motor vehicle, wherein the drive unit comprises an input shaft connected to the internal combustion engine, an output shaft connected to the dynamoelectric machine for rotation therewith and a clutch for connecting the input shaft to the output shaft, the clutch includes centrifugal actuators for causing engagement of the clutch upon rotation at a speed in excess of a threshold value, springs counteracting the centrifugal actuators for causing the release of the clutch at a speed below the threshold value, and an electromagnetic actuators for causing engagement of the clutch at a speed below the threshold value to permit startup operation of the internal combustion engine by the dynamoelectric machine.

Such an arrangement comprises as mechanical components a first disc which is connected for rotation with the input shaft, a second disc and friction wedges for the firm frictional engagement of the first disc with the second disc. Friction wedges are supported on the input shaft by way of springs and spacer bolts for establishing the auxiliary centrifugal forces.

As electromagnetic components, the clutch comprises stationary pulling magnets for generating an electromagnetic field and corresponding segments which can be magnetized and which are arranged on each friction wedge. By the energization of the pulling magnets, the forces generated by the springs are counteracted so that the friction wedges are brought into engagement with the first disc and the second disc, whereby the clutch is closed.

The arrangement according to the invention requires no auxiliary energy for holding the clutch in the open or in the closed stage. Only for closing the clutch is it necessary to energize the pulling magnets.

For starting the internal combustion engine, the starter-generator and the pulling magnets are energized whereby the clutch is closed and the internal combustion engine is coupled to the motor-generator. When the speed of the internal combustion engine reaches a certain threshold of for example 240 rpm, the pulling magnets are de-activated. When this speed threshold is exceeded, the centrifugal force of the friction wedges is large enough to establish a frictional connection between the first and the second friction discs by way of the friction wedges. During operation of the internal combustion engine, the clutch is maintained closed by the centrifugal force which is effective on the friction wedges.

In order to change over from combustion engine operation to electric motor operation, the speed of the internal combustion engine is lowered down to the rpm threshold value. At this point, the centripetal force on the friction wedges is greater than the centrifugal force. The friction wedges are then no longer engaged, that is, the clutch is open. Then the motor-generator is energized. For restarting the internal combustion engine with the motor-generator activated, the speed of the motor-generator is reduced down to the threshold value and then the pulling magnets are energized whereby the clutch is closed.

Another important advantage of the invention resides in the fact that the clutch needs to be actuated only during starting of the internal combustion engine. The differential torque to be transmitted herewith however is substantially smaller than the maximum engine torque. The control structure for the clutch, that is, the pulling magnets can therefore be relatively small. With the use of standard components, the arrangement according to the invention can be provided at relatively low costs.

Below, a preferred embodiment of the invention will be described in greater detail on the basis of the accompanying drawings.

DESCRIPTION OF A PREFERRED EMBODIMENT

Figure 1:
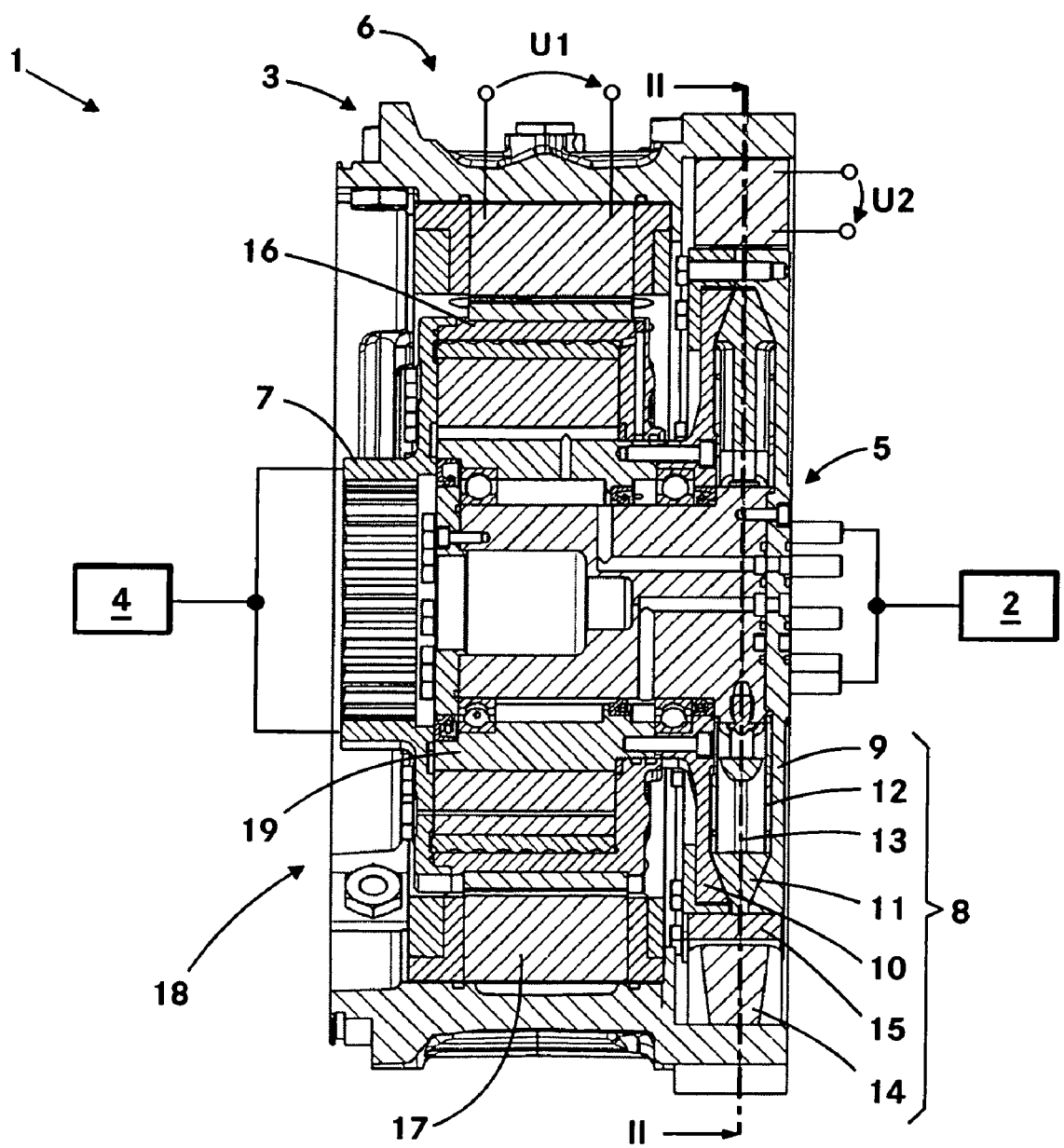
FIG. 1 is a cross-sectional view of the drive unit according to the invention.

FIG. 1 shows a drive unit 1 for a hybrid motor vehicle for coupling an internal combustion engine 2 and/or an electro-dynamic machine, that is a motor-generator 3, with a transmission 4. Within the drive unit 1, there are the following components: An input shaft 5, a clutch 8, the motor-generator 6, which corresponds to the electro-dynamic machine 3, a metal-elastic coupling 18 and an output shaft 7. The clutch 8 comprises the following mechanical components: A first disc 9, a second disc 10, several friction wedges 11, springs 12 and support bolts 13. Each friction wedge 11 is supported on the input shaft 5 by springs 12 and support bolts 13. The electromagnetic part of the clutch 8 consists of segments 15, which can be magnetized and of pulling magnets 14. The segments 15 are arranged at the outer circumference of the friction wedges 11, see the lower part of FIG. 1.

The input shaft is firmly connected for rotation with the internal combustion engine 2 and the first disc 9 of the clutch 8. The second disc 10 of the clutch 8 is bolted to a shaft 19 for rotation therewith. The shaft 19 corresponds to the inner splined support member of the metal elastic coupling 18, that is, for example, a Geislinger coupling. By way of the metal-elastic coupling 18, the torque of the shaft 19 is transmitted to a rotor 16 of the starter-generator 6 or, respectively, the torque of the rotor 16 is transmitted to the shaft 19. The starter-generator 6 as shown in FIG. 1 comprises a stationary stator or armature 17 and a rotatably supported rotor 16, here in the form of an inner rotor. The rotor 16 is connected to the output shaft 7 for rotation therewith.

Figure 2:
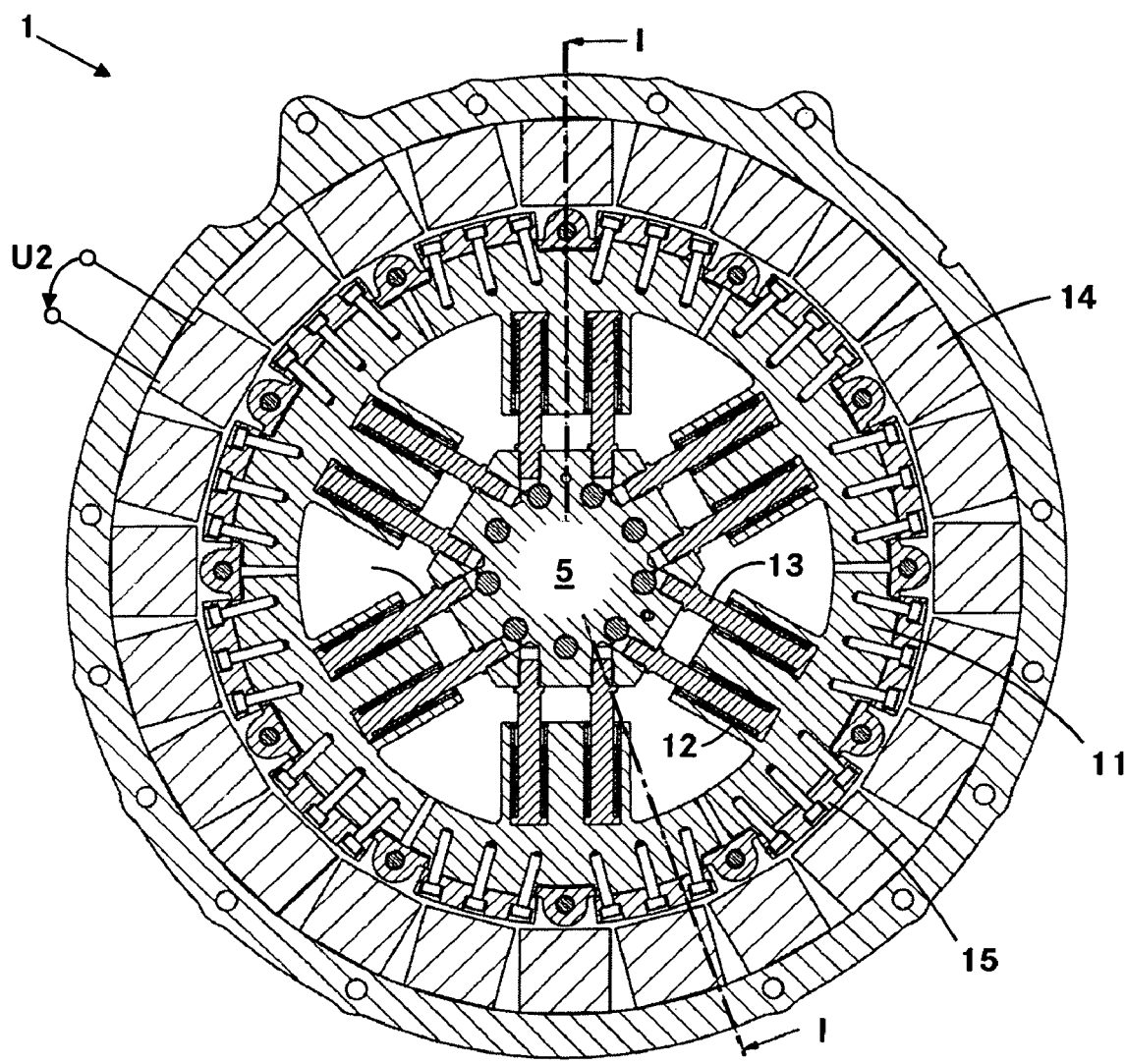
FIG. 2 is a sectional view taken along line II-II of FIG. 1.

FIG. 2 is a cross-sectional view of the drive unit 1 taken along line II-II of FIG. 1. In this representation six friction wedges 11 are visible. Each friction wedge 11 is supported on the input shaft 5 by two support bolts 13 and two springs 12. At the outer circumference of the friction wedge 11, the segments 15, which can be magnetized, are arranged for example by being bolted to the respective friction wedges 11. Corresponding to the segments 15, the pulling magnets 14 are provided so as to form together an electromagnetic circuit. If a voltage U2 is applied to the pulling magnets 14, a radial force is effective on the friction wedges 11 by way of the segments 15. Via the springs 12, a centripetal force acts on the friction wedges 11. In FIG. 2, a section line I-I is shown which corresponds to the representation of FIG. 1.

The drive unit 1 operates as follows:

At the outset, the motor-generator 6 and the internal combustion engine are de-activated. The clutch 8 is open as the springs 12 bias the friction wedges inwardly toward the axis of the input shaft 5. There is no force transmitting engagement between the first disc 9 and the second disc 10.

For starting the internal combustion engine 2, a voltage U1 is applied to the stator 17 and a voltage U2 is applied to the pulling magnets 14. The voltage U1 causes rotation of the rotor 16, the metal elastic coupling 18, the output shaft 7, the shaft 19 and the second disc 10. As a result of the application of the voltage U2, an electromagnetic field is formed between the pulling magnets 14 and the segments 15 whereby a radial force is generated with biases the friction wedges 11 radially outwardly. As a result, the friction wedges 11 are frictionally engaged with the first disc 9 and also with the second disc 10 so that the clutch 8 is closed. With the clutch 8 closed, the torque generated by the motor-generator 6 is transmitted via the input shaft 5 to the internal combustion engine and the engine is turned over. When the internal combustion engine 2 reaches a certain speed threshold nGW such as for example 240 rpm, the pulling magnets 14 are de-energized. At this speed threshold nGW the centrifugal force effective on the friction wedges 11 exceeds the centripetal force applied by the springs 12 so that the clutch 8 remains engaged. The speed threshold value nGW therefore can be determined by the selection of the springs 12. Above the threshold value nGW, the clutch 8 remains firmly closed since the centrifugal force effective on the friction wedges 11 ensures the engagement of the friction wedges 11. Upon activation of the engine 2, the engine rotates at an idling speed nLL of for example 700 rpm and the starter-generator 6 is deactivated and operated as a generator.

During operation of the internal combustion engine, the engine output power is transmitted to the output shaft 7 via the input shaft 5, the closed clutch 8 the metal-elastic clutch 18 and the rotor 16.

Upon transition from an operation by the internal combustion engine to an operation by the electric motor, the speed of the internal combustion engine 2 is reduced down to the threshold value nGW and the internal combustion engine 2 is deactivated. Below this value, the centripetal force applied by the springs 12 to the friction wedges 11 exceeds the centrifugal force effective on the friction wedges so that the clutch 8 is opened. Then the starter-generator 6 is energized so that the rotor 16 supplies a torque to the output shaft 7.

For restarting the internal combustion engine 2, with the starter-generator activated, the speed of the starter-generator 6 is lowered to the limit value nGW. Then the starting procedure as described earlier is initiated.

With the clutch 8 closed, also a parallel operation of the internal combustion engine 2 and the electric motor 3 can be provided.

In accordance with the description of FIGS. 1 and 2, a centripetal force as generated by the springs 12 is effective on the friction wedges 11 and a radially outwardly directed force as generated by the pulling magnets 14 is effective on the friction wedges 11 upon energization of the pulling magnets 14. By a suitable design change, this operational principle can also be reversed in that the friction wedges 11 are biased by the springs 12 into an engagement position and the wedges 11 are disengaged by the energization of the pulling magnets 14.

From the preceding description, the following advantages are apparent:

The clutch 8, when electromagnetically actuated, only needs to transmit the torque required for starting the internal combustion engine so that the clutch can be relatively small, however, also high engine torques can be transmitted through the clutch 8 at the higher engine speeds since the clutch engagement forces are then enhanced by centrifugal forces, since standard components are available for the construction of the drive unit, construction is cost effective, no auxiliary energy is required for keeping the clutch in the open or closed state.

What is claimed is:

1. A drive unit (1) for a hybrid motor vehicle for coupling an internal combustion engine (2) and a dynamo electric machine (3) to a transmission (4), said drive unit (1) comprising an input shaft (5) which is connected to the internal combustion engine (2) for rotation therewith, a starter-generator (6) serving also as the dynamic electric machine (3), an output shaft (7) which is connected to the transmission (4) for rotation therewith, wherein the starter-generator (6) and the internal combustion engine (2) are capable of supplying power to said output shaft (7), a clutch (8) for coupling the starter generator (6) to the internal combustion engine (2), said clutch (8) including radially outwardly movable engagement members (11) for the centrifugal-force enhanced actuation of the clutch (8) and also stationary electromagnets (14) arranged radially around said engagement members (11) for generating an electromagnetic field, said engagement members (11) consisting of magnetic material providing for a magnetic force based engagement of the clutch (8) when the engagement members (11) are subjected to an electromagnetic field generated by energization of the stationary electromagnets (14).

2. A drive unit according to claim 1, wherein the clutch (8) comprises as mechanical components a first disc (9), which is connected for rotation with the input shaft (5), a second disc (10) arranged opposite the first disc (9), said engagement members (11) being friction wedges (11) arranged between the first and second discs (9, 10), springs (12) radially engaging the friction wedges (11) and support bolts (13) supporting the friction wedges (11) on the input shaft (5).

3. A drive unit according to claim 2, wherein the springs (12) are compression springs biasing the friction wedges (11) radially inwardly.

4. A drive unit according to claim 2, wherein the friction wedges (11), the springs (12) and the support bolts (13) are cooperating in such a way that, during rotation of the input shaft (5) below a threshold value (nGW), the friction wedges (11) are not in frictional engagement with the first and the second discs (9, 10).

5. A drive unit according to claim 2, wherein segments (15) of magnetic material are connected to the friction wedges (11) for pulling the friction wedges into engagement with the first and second discs (9, 10).

6. A drive unit according to claim 5, wherein the segments (15) are connected to the friction wedges for pulling the friction wedges (11) into engagement with the friction discs (9, 10).

7. A drive unit according to claim 6, wherein the stationary magnets (14) are pulling magnets (14) which cooperate with the segments (15) in such a way that, upon energization of electromagnets (14), the friction wedges (11) are pulled against the force of the springs (12) into engagement with the first and the second friction discs (9, 10).

8. A drive unit according to claim 1, wherein the starter-generator (6) includes a rotor (16) which is connected for rotation with the output shaft (7) and, by way of a metal-elastic coupling (18), with the clutch (8).

9. A method of controlling a drive unit (1) for a hybrid motor vehicle for coupling an internal combustion engine (2) and a dynamoelectric machine (3) to a transmission (4), the drive unit (1) including an input shaft (5) which is connected for rotation with the internal combustion engine (2), an output shaft (7), which is connected to the transmission (4) and to the dynamoelectric machine (3) for driving the output shaft (7) or to be driven thereby and a clutch (8) for connecting the input shaft (5) to the output shaft (7) including means for a centrifugal force-enhanced engagement of the clutch (8) and electrically actuated pulling magnets (14) for initiating engagement of the clutch (8), said method comprising the steps of:

for starting the internal combustion engine (2), energizing, the dynamoelectric machine (3) and also the pulling magnets (14) so as to close the clutch (8) and provide for rotation of the engine by the dynamoelectric machine (3), deactivating the pulling magnets (14) when the engine (2) speed has reached a threshold value (nGW) and the engine has started to operate, during the transition from operation by the internal combustion engine to an operation by the dynamo electric machine, lowering in a first step the speed of the internal combustion engine (2) to the threshold value (nGW) whereby the clutch (8) opens and, in a second step, activating the dynamoelectric machine (3) for driving the output shaft while the engine is shut down, for restarting the engine (2) while the dynamoelectric machine is activated, reducing, in a first step, the speed of the dynamoelectric machine (3) to the threshold value (nGW), energizing, in a second step, the pulling magnets (14) for closing the clutch (8) and, when the internal combustion engine has reached the speed of the threshold value (nGW), in a third step, deactivating the pulling magnetic (14).

\* \* \* \* \*